United States Patent [19]

Fuke

[11] Patent Number: 4,651,247

[45] Date of Patent: Mar. 17, 1987

[54] CARRIAGE MOVING MECHANISM FOR RECORDING AND REPRODUCING DEVICE

[75] Inventor: Takamichi Fuke, Furukawa, Japan

[73] Assignee: Alps Electric Co., Ltd, Japan

[21] Appl. No.: 660,511

[22] Filed: Oct. 12, 1984

[30] Foreign Application Priority Data

Oct. 13, 1983 [JP]  Japan .................... 58-157268[U]

[51] Int. Cl.⁴ .................... G11B 5/55; G11B 21/08
[52] U.S. Cl. .................................................. 360/106
[58] Field of Search ............. 360/106, 104, 105, 97-99

[56] References Cited

U.S. PATENT DOCUMENTS

| | | | |
|---|---|---|---|
| 3,882,541 | 5/1975 | Ghose et al. | 360/106 |
| 4,131,923 | 12/1978 | Wachs et al. | 360/106 |
| 4,315,289 | 2/1982 | Holecek et al. | 360/106 |
| 4,383,283 | 5/1983 | Machut | 360/106 |

OTHER PUBLICATIONS

Holecek et al., "Archimedean Cam Actuator for Transducer", IBM Technical Disclosure Bulletin, vol. 22, No. 9, Feb. 1980, pp. 4152-4154.

Arrington et al., "Transducer-Positioning Mechanism", IBM Technical Disclosure Bulletin, vol. 22, No. 12, May 1980, pp. 5232-5233.

Larson, "Magnetic Head Restoration Mechanism", IBM Technical Disclosure Bulletin, vol. 17, No. 6, Nov. 1974, pp. 1714-1715.

Primary Examiner—John H. Wolff
Assistant Examiner—Matthew J. Bussan
Attorney, Agent, or Firm—Guy W. Shoup

[57] ABSTRACT

In a recording and reproducing device for a magnetic disc, including a carriage supporting a magnetic head, an engaging piece secured to the carriage, and a screw threaded shaft engaging with the engaging piece for causing a linear shift of the carriage, the screw threaded shaft is formed with a plurality of groove portions. Each of the groove portions has a substantially linear groove bottom of a leading angle substantially equal to 0°. The groove portions are arranged in an equally spaced apart relation around the surface of the shaft so that the portions are mutually displaced in the axial direction of the shaft by a predetermined distance, and that when these are connected together, a kind of helical groove is formed around the surface of the shaft. To be cooperative with the helical groove, the engaging piece is provided with a linear projecting end portion engageable with each of the groove portions.

5 Claims, 7 Drawing Figures

CARRIAGE MOVING MECHANISM FOR RECORDING AND REPRODUCING DEVICE

BACKGROUND OF THE INVENTION

1. Field of the Invention

This invention relates to a recording and reproducing device for a magnetic disc, which is adapted to be used as a terminal device for a computer, word processor and the like.

2. Description of Prior Art

Heretofore, so-called steel belt type mechanisms have been widely used in the recording and reproducing device for a magnetic disc for shifting a carriage supporting a magnetic head intermittently in a diametrical direction of the magnetic disc. However, since the mechanisms of this type have difficulties in attaching and tension-adjusting the steel belt and in economizing space factor, screw-threaded shaft type mechanisms tend to be used recently instead of the steel belt type mechanisms for shifting the carriage of the recording and reproducing device because of the advantageous feature in economizing the space factor.

FIG. 1 is a plan view showing a conventional screw-threaded shaft type mechanism for shifting the carriage intermittently. The mechanism comprises a step motor 1 secured to a chassis 2, and a screw-threaded shaft 3 having a helical groove 3a on the outer surface. The shaft 3 is directly coupled to a cylindrical permanent magnet (not shown) constituting the rotor of the step motor 1 which is rotatably supported by a bearing (not shown) in the casing of the motor 1, while the other end of the shaft 3 is rotatably supported by a bearing 4. Numeral 5 designates the carriage which supports recording and reproducing magnetic head 6. The mechanism further comprises two guide shafts 7 and 8 for guiding the movement of the carriage 5, and an engaging piece 9 secured to the carriage 5. The engaging piece 9 has a conical projection 9a engaging with the helical groove 3a of the screw-threaded shaft 3.

With the above described construction, when the step motor 1 rotates the screw-threaded shaft 3 in the forward or reverse direction, the conical projection 9a engaging with the helical groove 3a of the shaft 3 is shifted in the arrow marked direction in FIG. 1, and hence the carriage 5 is reciprocated along the guide shafts 7 and 8 for a distance corresponding to the rotating angle of the screw-threaded shaft 3.

The helical groove 3a of the screw-threaded shaft 3 has a constant leading angle 0 around the circumference thereof as shown in FIG. 2, so that it can be developed into a linear line. Thus, when the movement of the carriage 5 is intermittently stopped at, for instance, eight positions corresponding to the rotating angles 0°, 45°, 90°, 135°, 180°, 225°, 270° and 315° of the screw-threaded shaft 3, the position of the carriage 5 tends to be deviated depending on the irregularity in the inertia of the carriage or in the control of the step motor 1, thus adversely affecting to the accuracy of recording and reproduction of the magnetic head 6.

SUMMARY OF THE INVENTION

An object of the present invention is to provide a recording and reproducing device for a magnetic disc wherein the above described difficulties of the conventional construction can be substantially eliminated.

Another object of the present invention is to provide a recording and reproducing device for a magnetic disc wherein the shifting, stopping and positioning of the carriage can be carried out accurately.

According to the present invention, there is provided a recording and reproducing device for a magnetic disc, comprising a carriage for supporting a recording and reproducing magnetic head, an engaging piece secured to the carriage, and a screw threaded shaft engaging with the engaging piece so that a rotation of the screw-threaded shaft for a predetermined angle causes a linear shift of the carriage for a predetermined pitch, characterized in that the screw-threaded shaft is modified such that a plurality of groove portions, each having a substantially linear groove bottom of a leading angle substantially equal to 0°, are formed circumferentially on the surface of the shaft, these groove portions are connected together in a manner mutually displaced in the axial direction of the shaft such that a kind of helical groove is formed around the surface of the shaft, and that the engaging piece is provided with a linear projecting end portion engageable with each of the groove portions.

The number of the groove portions may be selected to be eight for one pitch with the portions provided at angular positions of 0°, 45°, 90°, 135°, 180°, 225°, 270° and 315°.

The engaging piece may be so constructed that a separate piece having a linear projecting end portion engageable with each of the groove portions is secured to a resilient metal member. Otherwise, the engaging piece may be made of a resilient metal plate folded at a suitable angle thereby to form a linear projecting end portion engageable with the groove portions.

DESCRIPTION OF THE PREFERRED EMBODIMENTS

Preferred embodiments of the invention will now be described with reference to FIGS. 3 through 7.

Figure 1:
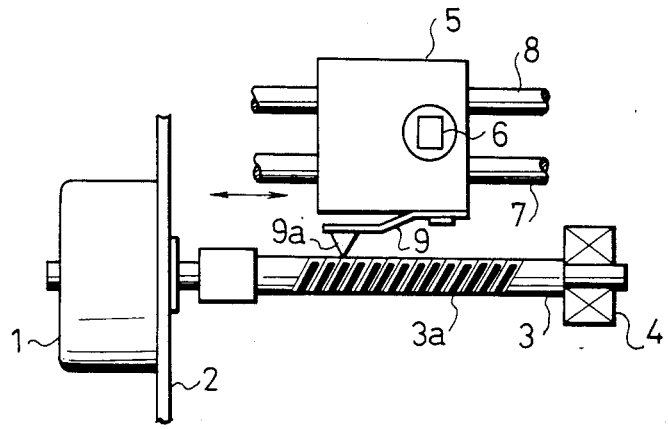
FIG. 1 is a plan view showing a conventional carriage shifting mechanism in a simplified manner.
Figure 2:
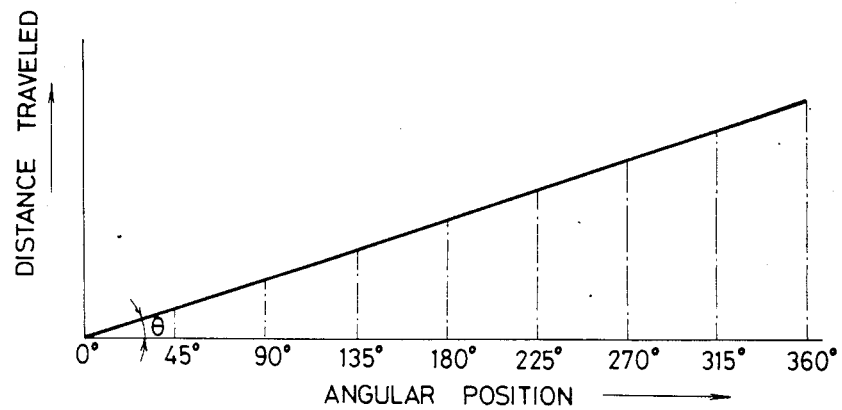
FIG. 2 is an explanatory diagram showing a relation between the lead angle of a screw threaded shaft and the moved distance of a carriage provided in the conventional mechanism shown in FIG. 1.
Figure 3:
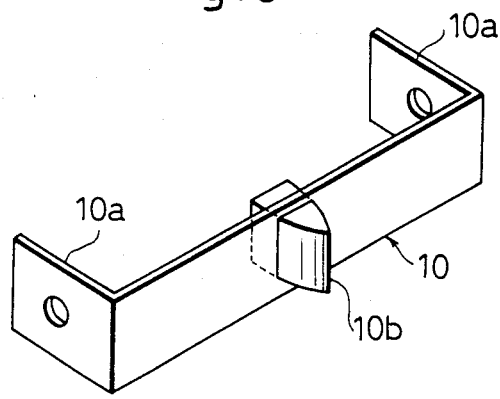
FIGS. 3 and 4 are perspective views showing different embodiments of an engaging piece used in the present invention.
Figure 4:
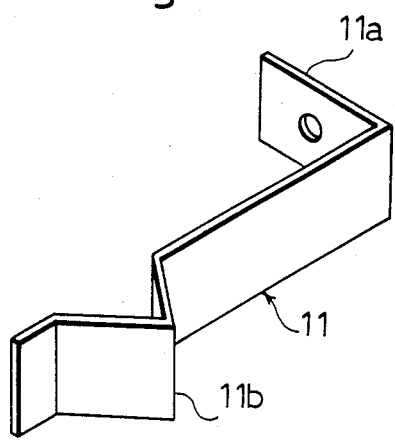

FIGS. 3 and 4 illustrate different embodiments of an engaging piece used in the present invention, one being of a bridge type and the other being of a cantilever type. The engaging pieces 10 and 11 shown in FIGS. 3 and 4 are made of stainless steel or phosphor bronze formed into a planar state. The bridge type engaging piece 10 has both ends 10a folded at right angles and secured precisely to a predetermined position on the carriage 5 by means of machine screws and the like. On the other hand, the cantilever type engaging piece shown in FIG.

4 has one end 11a folded and secured to the carriage 5 as in the case of the bridge type embodiment. At the central portion of the engaging piece 10, there is provided a projecting member 10b having a linear projecting end. The member 10b is made of copper or copper alloy and bonded to the central portion of the engaging piece 10 by welding or else. In contrast the engaging piece 11 has a projecting portion 11b bent formed at the free end thereof so as to provide a linear projecting end.

Figure 5:
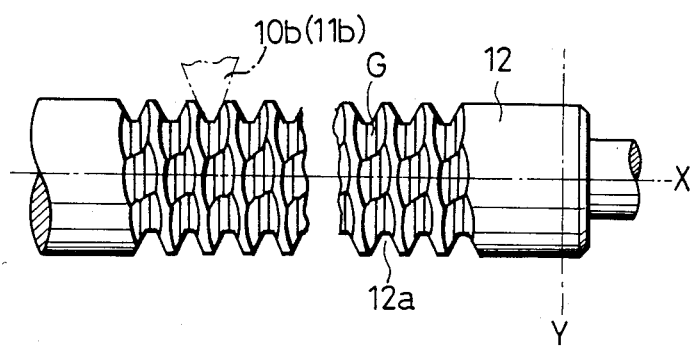
FIG. 5 is an enlarged view showing an important part of the screw threaded shaft modified according to the present invention.

FIG. 5 illustrates a screw threaded shaft 12 that is modified according to the present invention to be engageable with the projecting portion 10b or 11b of the above described engaging piece 10 or 11. This shaft 12 is also secured to the permanent magnet of the step motor, while both ends thereof being supported freely rotatably by suitable bearing means.

According to the modification, there are provided along a predetermined length of the shaft 12 a plurality of groove portions G each having a leading angle θ substantially equal to 0°. That is, the groove portions G extend in parallel with Y axis which is perpendicular to the axial line X of the shaft 12. Each groove portion G has a linear or quasi-linear bottom (see FIG. 6) which is adapted to receive the linear end of the projecting portion 10b or 11b. The plurality of groove portions G are connected together in communication with the portions being displaced successively in the axial direction of the shaft 12, so that a kind of helical groove 12a is thereby formed. The projecting portion 10b or 11b of the engaging piece 10 or 11 is urged by the resilience thereof into the helical groove 12a.

Figure 6:
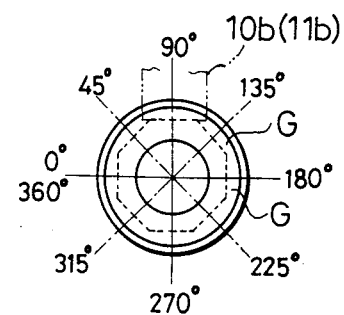
FIG. 6 is a side view of the screw threaded shaft shown in FIG. 5.

In the above described embodiment, eight groove portions G are provided for one pitch of the helical groove 12a (360° angle around the axial line) in an equal spaced apart relation as shown in FIG. 6. Furthermore, the starting and stopping positions of the step motor are so selected that the positions coincide with the centers of the eight groove portions G provided at angular positions 0°, 45°, 90°, 135°, 180°, 225°, 270° and 315°, respectively.

Figure 7:
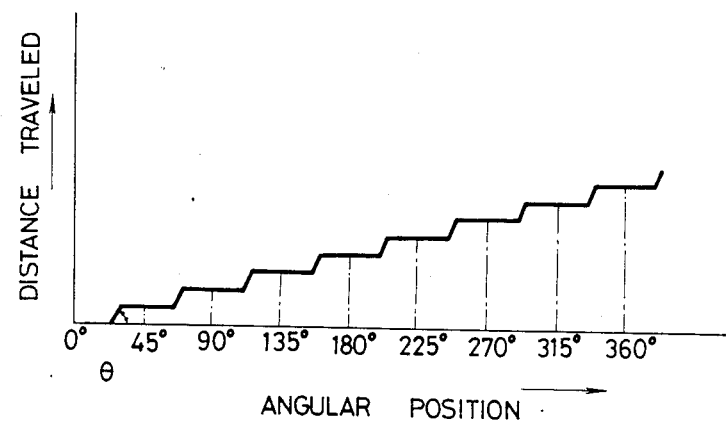
FIG. 7 is an explanatory diagram showing a relation between the lead angle of the shaft and the moved distance of the carriage.

Thus, when the step motor is rotated for a desired number of steps to a desired angular position, the engaging piece 10 or 11, and hence the carriage, is shifted by a distance corresponding to the rotated amount of the shaft 12. Since each of the positions, in which the engaging piece 10 or 11 is shifted, corresponds to the central point of the groove portion G of a leading angle substantially equal to 0° as shown in FIG. 7, and furthermore the projecting portion 10b (or 11b) of the engaging piece 10 (or 11) has a linear end, the stopping position of the carriage 1 can be defined accurately so far as the projecting portion 10b (or 11b) engages with the groove portion G in the range having the leading angle of 0° regardless of some amount of transmission error or attenuating vibration caused in the operation of the step motor.

According to the present invention, at each of stopped positions of the screw threaded shaft, the projecting portion of the engaging piece can thus be positioned in the corresponding groove portion having a leading angle substantially equal to 0°, and hence an accurate control of the carriage can be assured regardless of transmission errors or assembly errors of the related parts, thus making it possible to expect accurate recording and reproduction of the magnetic head. The linear end of the projecting portion contacting with the linear bottom of the groove portion suppresses the attenuating vibration of the step motor and improves the engagement between the two portions, which in turn provides advantageous features such as improving the reliability of the force transmission between the two portions and assuring smooth movement of the projecting portion of the engaging piece along an oblique passage formed between each adjacent pair of groove portions.

What is claimed is:

1. In a recording and reproducing device for a magnetic disc, comprising a carriage for supporting a recording and reproducing magnetic head, an engaging piece secured to said carriage, and a screw threaded shaft engaging with said engaging piece so that a rotation of said screw threaded shaft for a predetermined angle causes a linear shift of said carriage for a predetermined distance, the improvement wherein said screw threaded shaft is modified such that a plurality of groove portions, each having a substantially linear groove bottom of a leading angle substantially equal to 0°, are formed circumferentially on the surface of said shaft, these groove portions are connected together in a manner mutually displaced in the axial direction of the shaft such that a kind of helical groove is formed around the surface of said shaft, and said engaging piece is provided with a linear projecting end portion parallel to and engageable with said linear groove bottoms.

2. A recording and reproducing device for a magnetic disc as set forth in claim 1 wherein eight of said groove portions are provided at angular positions of 0°, 45°, 90°, 135°, 180°, 225°, 270° and 315° around the surface of said shaft in a manner mutually displaced in the axial direction of said shaft by a predetermined distance.

3. A recording and reproducing device for a magnetic disc as set forth in claim 1 wherein said engaging piece comprises a planar spring member made of a resilient metal strip.

4. A recording and reproducing device for a magnetic disc as set forth in claim 3 wherein said planar spring member has two end portions folded at right angles so as to be secured to said carriage, and a projecting member having a linear projecting end is bonded to a central part of said planar spring member.

5. A recording and reproducing device for a magnetic disc as set forth in claim 3 wherein one end portion of said planar spring member is folded at right angles to be secured to said carriage, while the other end portion thereof is folded into a projecting portion having a linear projecting end which is engageable with any of said groove portions precisely.

* * * * *